(12) United States Patent
Wiener et al.

(10) Patent No.: US 10,922,215 B2
(45) Date of Patent: Feb. 16, 2021

(54) FEATURE TOGGLING USING A PLUGIN ARCHITECTURE IN A REMOTE NETWORK MANAGEMENT PLATFORM

(71) Applicant: ServiceNow, Inc., Santa Clara, CA (US)

(72) Inventors: David Joshua Wiener, Ramat Biet Shemesh (IL); Adar Margalit, Modiin (IL); Haviv Rosh, Modiin (IL)

(73) Assignee: ServiceNow, Inc., Santa Clara, CA (US)

( * ) Notice: Subject to any disclaimer, the term of this patent is extended or adjusted under 35 U.S.C. 154(b) by 75 days.

(21) Appl. No.: 15/954,212

(22) Filed: Apr. 16, 2018

(65) Prior Publication Data

US 2019/0317887 A1 Oct. 17, 2019

(51) Int. Cl.
*G06F 9/44* (2018.01)
*G06F 11/36* (2006.01)
*G06F 9/455* (2018.01)
*G06F 9/445* (2018.01)

(52) U.S. Cl.
CPC ...... *G06F 11/3688* (2013.01); *G06F 9/44526* (2013.01); *G06F 9/45529* (2013.01); *G06F 11/3664* (2013.01); *G06F 11/3684* (2013.01)

(58) Field of Classification Search
CPC ......... G06F 113/3688; G06F 113/3684; G06F 113/3664; G06F 9/44526; G06F 9/45529
See application file for complete search history.

(56) References Cited

U.S. PATENT DOCUMENTS

| | | |
|---|---|---|
| 6,678,887 B1 | 1/2004 | Hallman |
| 7,020,706 B2 | 3/2006 | Cates |
| 7,716,353 B2 | 5/2010 | Golovinsky |
| 7,769,718 B2 | 8/2010 | Murley |
| 7,925,981 B2 | 4/2011 | Pourheidari |
| 8,402,127 B2 | 3/2013 | Solin |
| 8,612,408 B2 | 12/2013 | Trinon |
| 8,832,652 B2 | 9/2014 | Mueller |

(Continued)

OTHER PUBLICATIONS

Pete Hodgson, Feature Toggles (aka Feature Flags), Mar. 5, 2018 (downloaded from public web site https://martinfowler.com/articles/feature-toggles.html).

(Continued)

*Primary Examiner* — Lewis A Bullock, Jr.
*Assistant Examiner* — Mohammad H Kabir
(74) *Attorney, Agent, or Firm* — Fletcher Yoder PC

(57) ABSTRACT

A remote network management platform software application containing application programming interfaces (APIs) may be configured to facilitate the use of plugin software. A particular API may be associated with logic configured to check whether a toggle variable is active or inactive. A first unit of program code may be configured to execute when the toggle variable is inactive, and a second unit of program code may be configured to execute when the toggle variable is active. First plugin software may be implemented in a scripting language. The first plugin software, whether enabled or disabled, might not affect the toggle variable. Second plugin software may also be implemented in the scripting language. The second plugin software, when enabled, is configured to set the toggle variable as active.

15 Claims, 16 Drawing Sheets

(56) References Cited

U.S. PATENT DOCUMENTS

| | | | |
|---|---|---|---|
| 8,881,111 B1* | 11/2014 | Smith | G06F 11/3692 |
| | | | 717/125 |
| 9,065,783 B2 | 6/2015 | Ding | |
| 9,098,322 B2 | 8/2015 | Apte | |
| 9,122,552 B2 | 9/2015 | Whitney | |
| 9,317,327 B2 | 4/2016 | Apte | |
| 9,363,252 B2 | 6/2016 | Mueller | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,805,322 B2 | 10/2017 | Kelkar | |
| 2008/0294854 A1* | 11/2008 | Schneider | G06F 3/0613 |
| | | | 711/154 |
| 2011/0219451 A1* | 9/2011 | McDougal | G06F 21/562 |
| | | | 726/23 |
| 2017/0364436 A1* | 12/2017 | Staykov | G06F 11/3664 |

OTHER PUBLICATIONS

Feature Toggles, Mar. 5, 2018 (downloaded from public web site https://github.com/grails/grails-core).

* cited by examiner

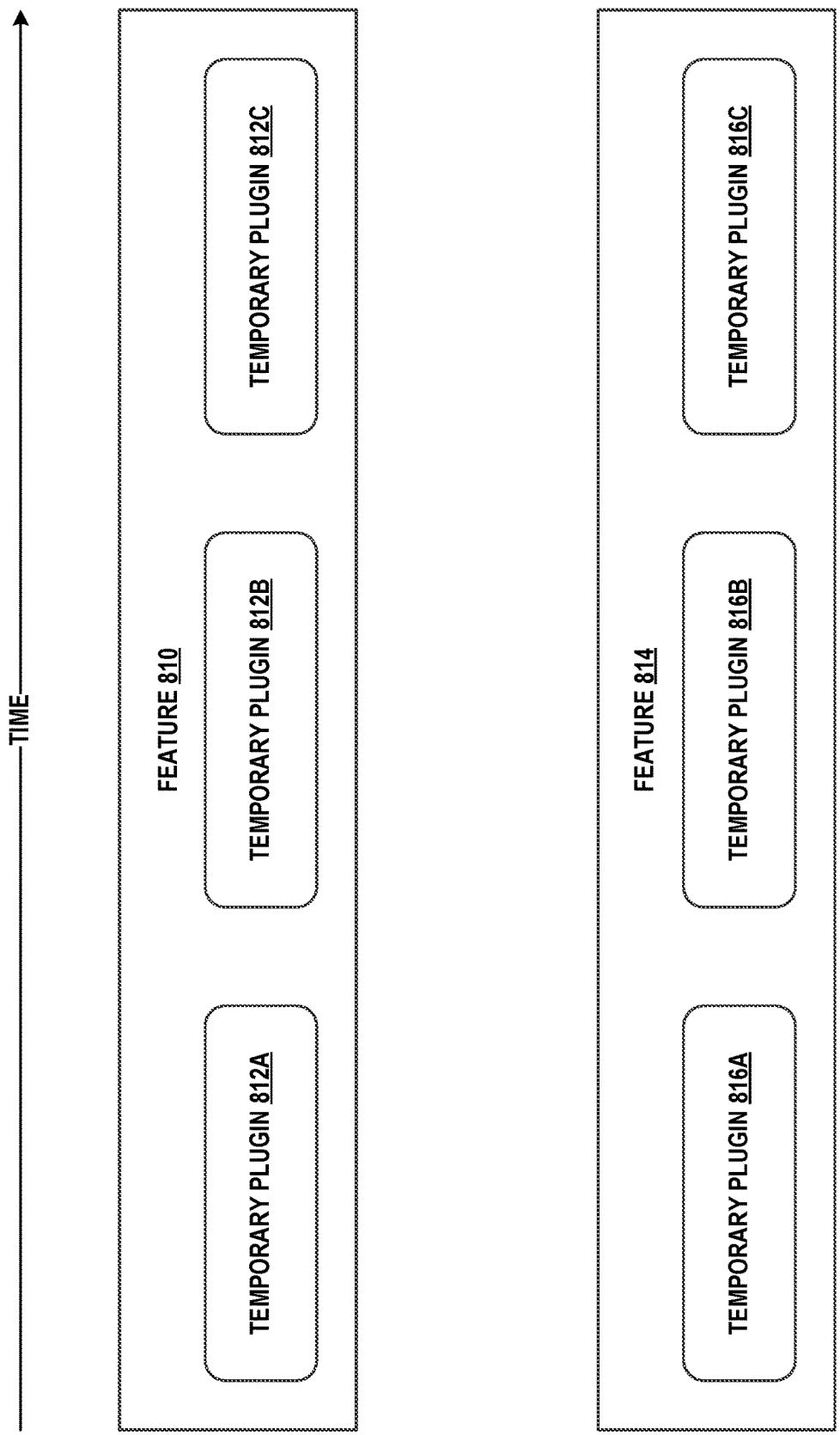

FEATURE TOGGLING USING A PLUGIN ARCHITECTURE IN A REMOTE NETWORK MANAGEMENT PLATFORM

BACKGROUND

Software development can be a complex undertaking, potentially with multiple individuals developing code in parallel. In some cases, various modules of the code may be dependent on the completion and proper operation of other modules. Thus, integration and testing of this code can be a cumbersome procedure, as defects in one module can impact other modules as well, and determining the module that is actually causing any particular defect may not be straightforward. As a consequence, new releases of the software may require an extensive amount of time to prepare, and might spend the majority of time not in a release-ready (shippable) state.

SUMMARY

The embodiments herein involve employing a plugin software architecture during development and testing procedures. A plugin is code that can be dynamically enabled or disabled in a host software application. Individual features are divided into logically distinct increments, each of which is developed as a separate temporary plugin. These plugins are developed and tested independently of other plugins, to the extent possible. When a plugin has completed development and passed its testing requirements, it can be added to the host software application as a shippable plugin. In this manner, features and increments are isolated and can be integrated when ready, while the host software application is maintained in a constant or near-constant shippable state. Furthermore, regression and new feature testing is simplified because the host software application can be regression tested with the plugin disabled, while new features can be tested with the plugin enabled.

Accordingly, a first example embodiment may involve one or more server devices. The first example embodiment may further involve a remote network management platform software application, executable by the one or more server devices, containing application programming interfaces (APIs) configured to facilitate the use of plugin software with the remote network management platform software application. A particular API may be associated with logic configured to check whether a toggle variable is active or inactive, where a first unit of program code within the remote network management platform software application is configured to execute when the toggle variable is inactive, and where a second unit of program code within the remote network management platform software application is configured to execute when the toggle variable is active. The first example embodiment may further involve first plugin software implemented in a scripting language, where the first plugin software, whether enabled or disabled, does not affect the toggle variable. The first example embodiment may further involve second plugin software implemented in the scripting language, where the second plugin software, when enabled, is configured to set the toggle variable as active.

A second example embodiment may involve operating a remote network management platform software application containing APIs configured to facilitate the use of first plugin software and second plugin software with the remote network management platform software application. The first plugin software may be implemented in a scripting language. The first plugin software, whether enabled or disabled, does not affect a toggle variable. The second plugin software may be implemented in the scripting language. The second plugin software, when enabled, is configured to set the toggle variable as active. The second example embodiment may further involve enabling the first plugin software. At this point, the second plugin software is disabled. The second example embodiment may further involve receiving, from the first plugin software and by way of a particular API of the remote network management platform, a first request. The particular API may be associated with logic configured to check whether the toggle variable is active or inactive. The second example embodiment may further involve, possibly based on the toggle variable being inactive, executing a first unit of program code within the remote network management platform software application. The second example embodiment may further involve enabling the second plugin software. The second example embodiment may further involve receiving, from the second plugin software and by way of the particular API, a second request. The second example embodiment may further involve, possibly based on the toggle variable being active, executing a second unit of program code within the remote network management platform software application.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8B depicts parallel development of features using plugins, in accordance with example embodiments.

DETAILED DESCRIPTION

Figure 1:
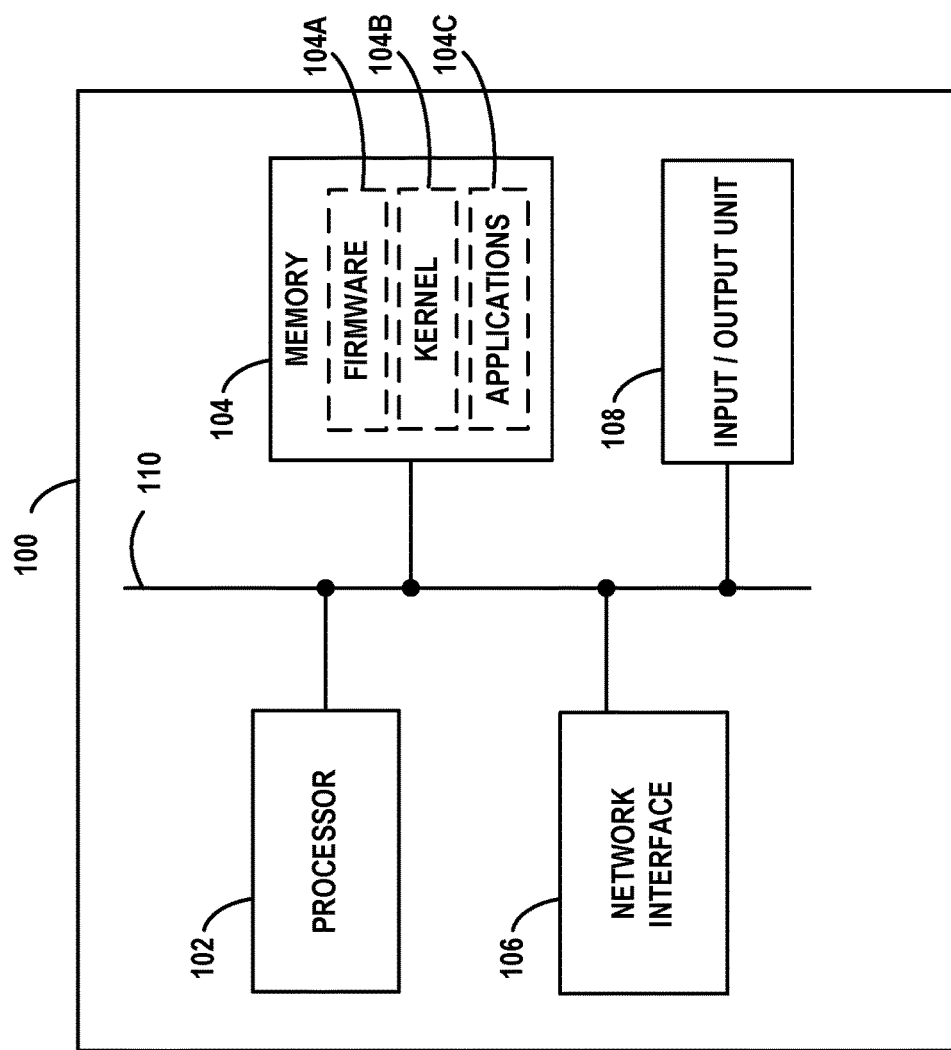
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100.

Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
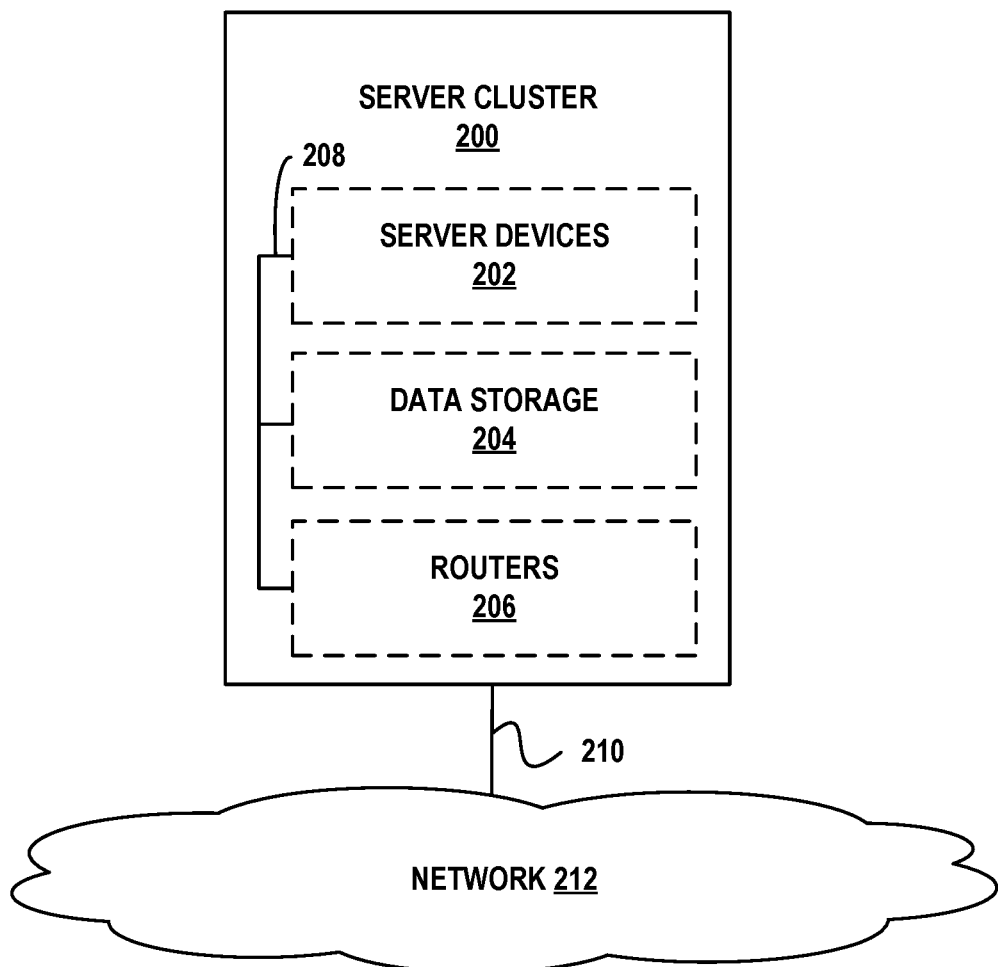
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
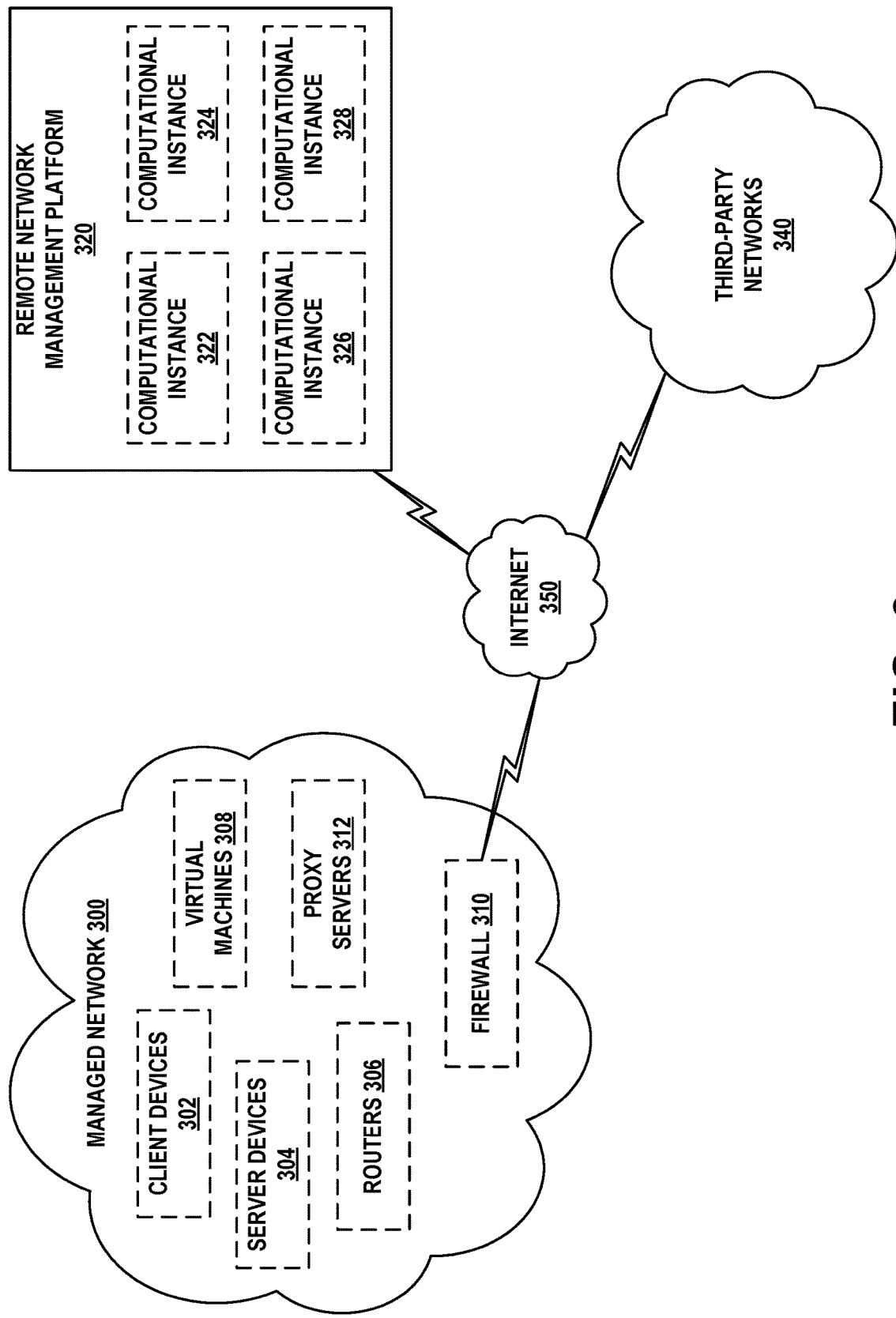
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200)

that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
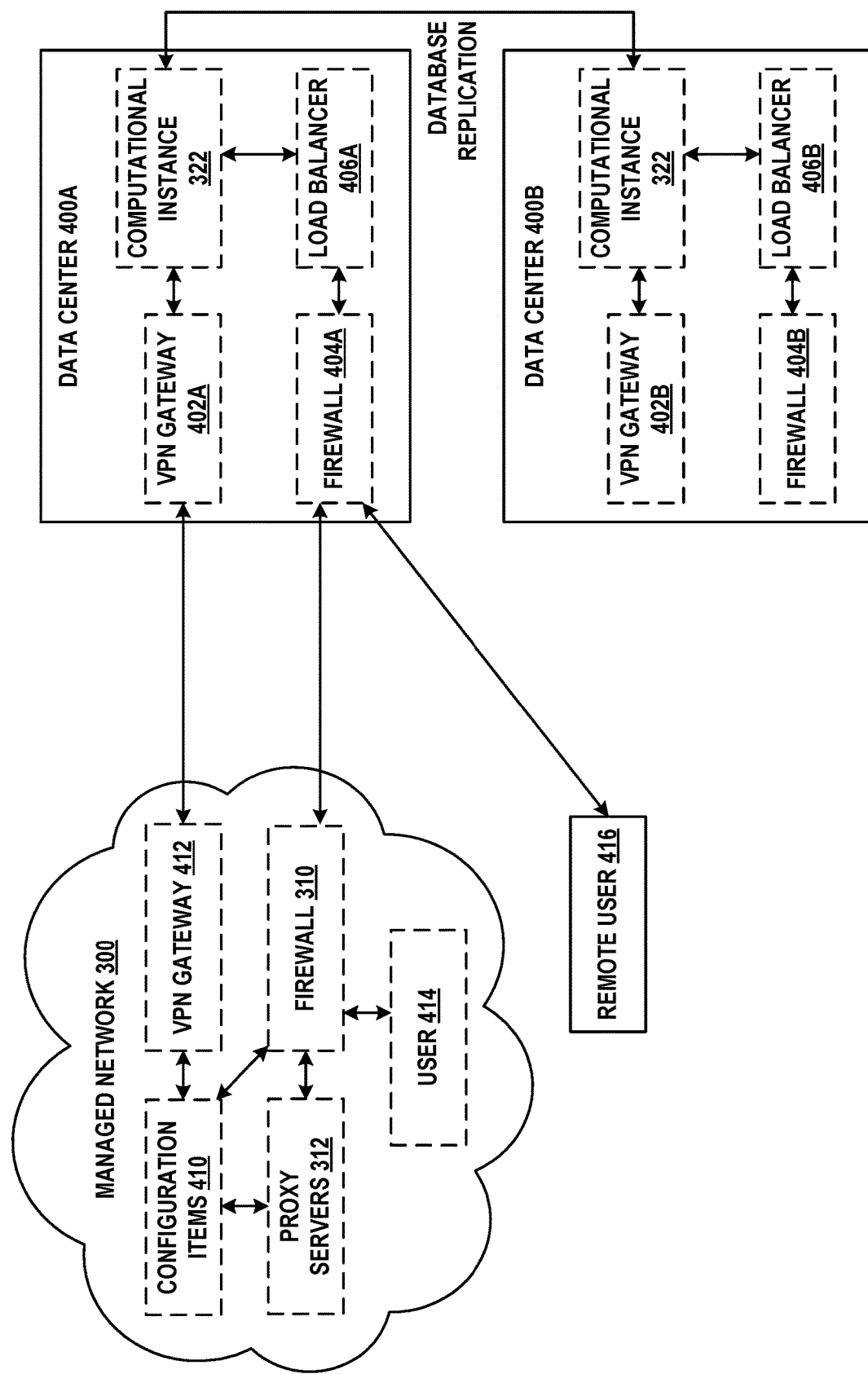
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
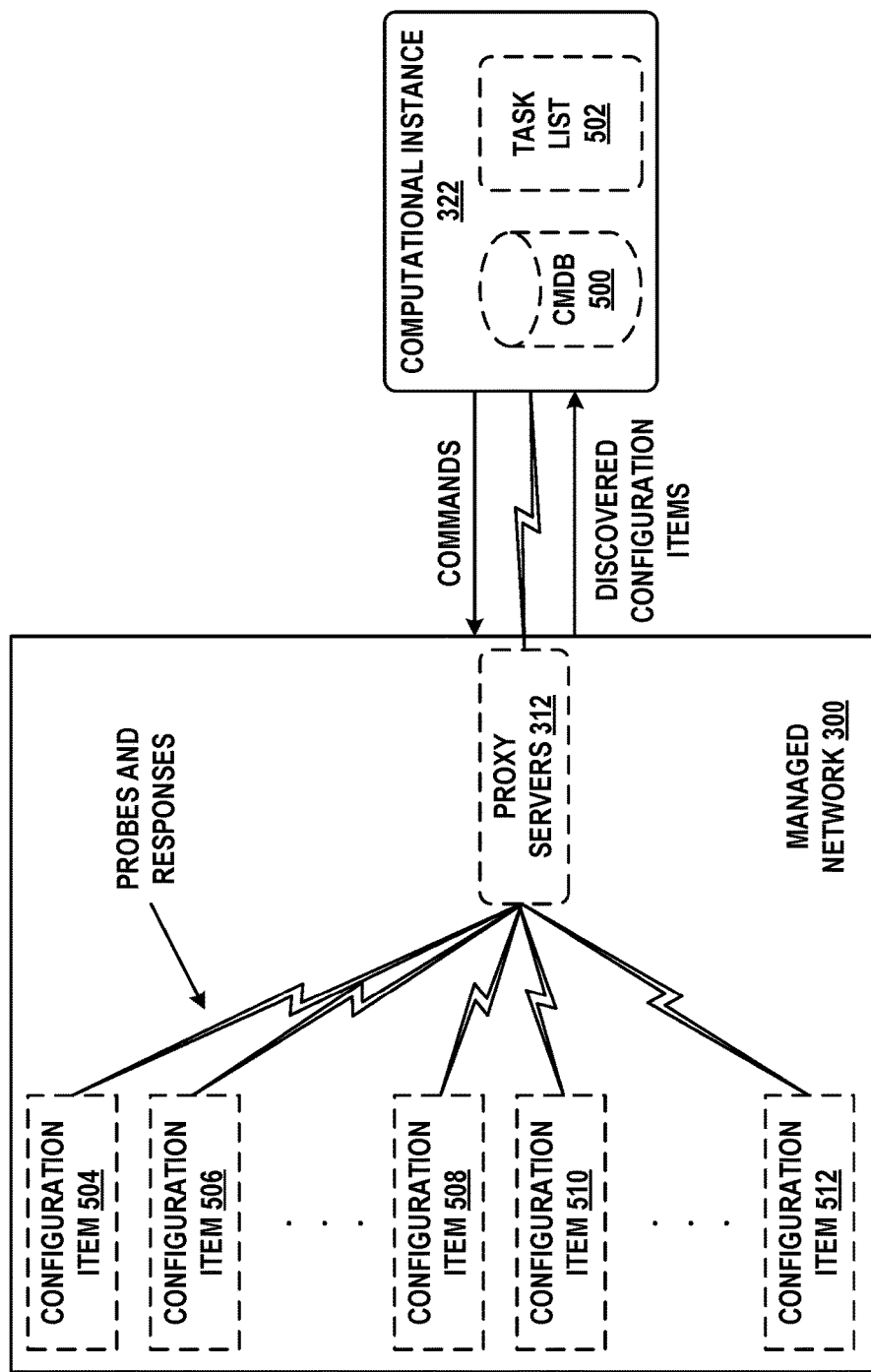
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
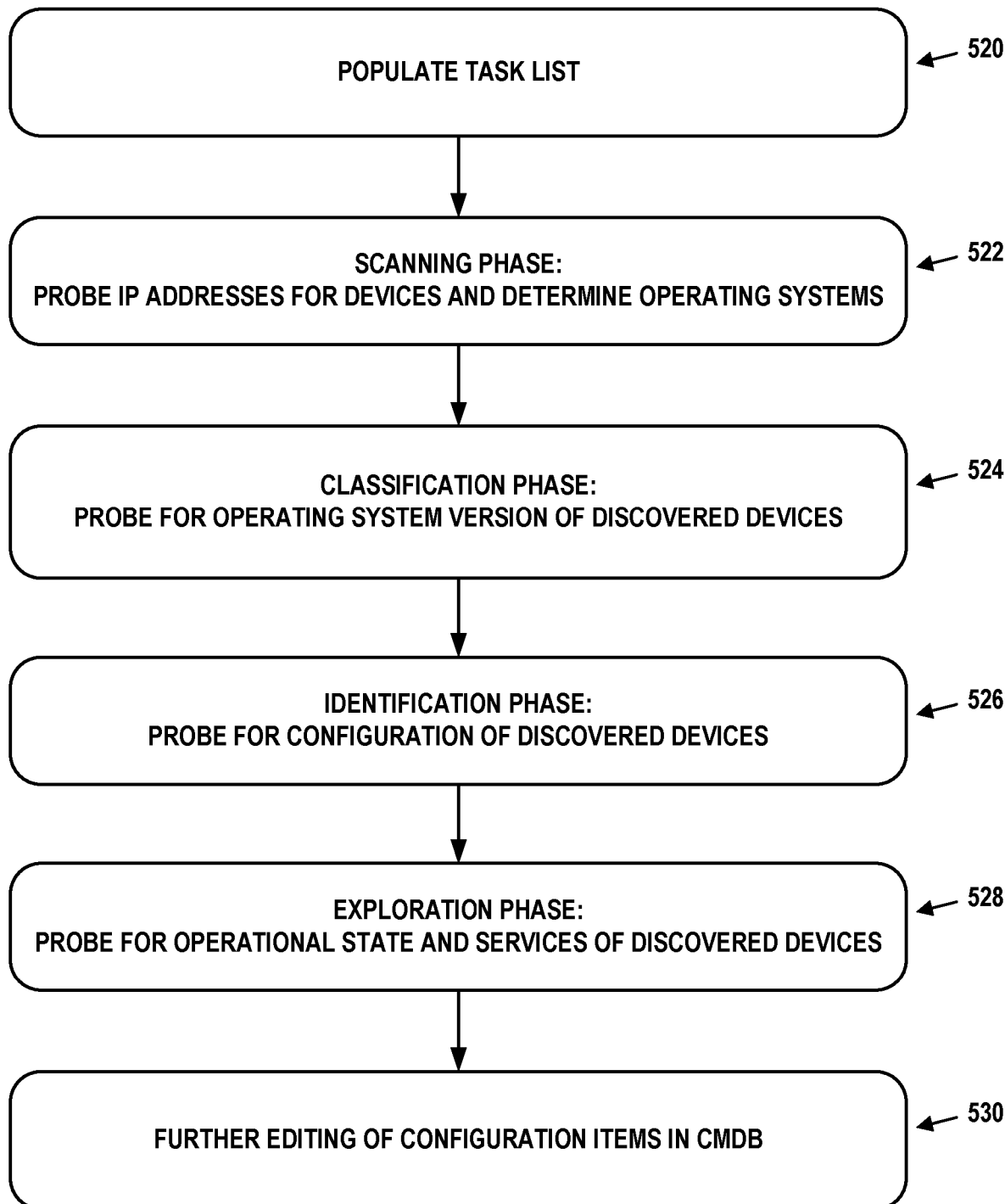
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. PLUGINS

Plugins are software modules that add one or more specific, discrete features to a host software program. Plugins may be supported by the host software program in order to make it more customizable and flexible. As an example, most popular web browsers support plugins to extend their functionality. In some cases, plugins may be written by the entity providing the host software program or the plugins may be written by other entities.

Figure 6A:
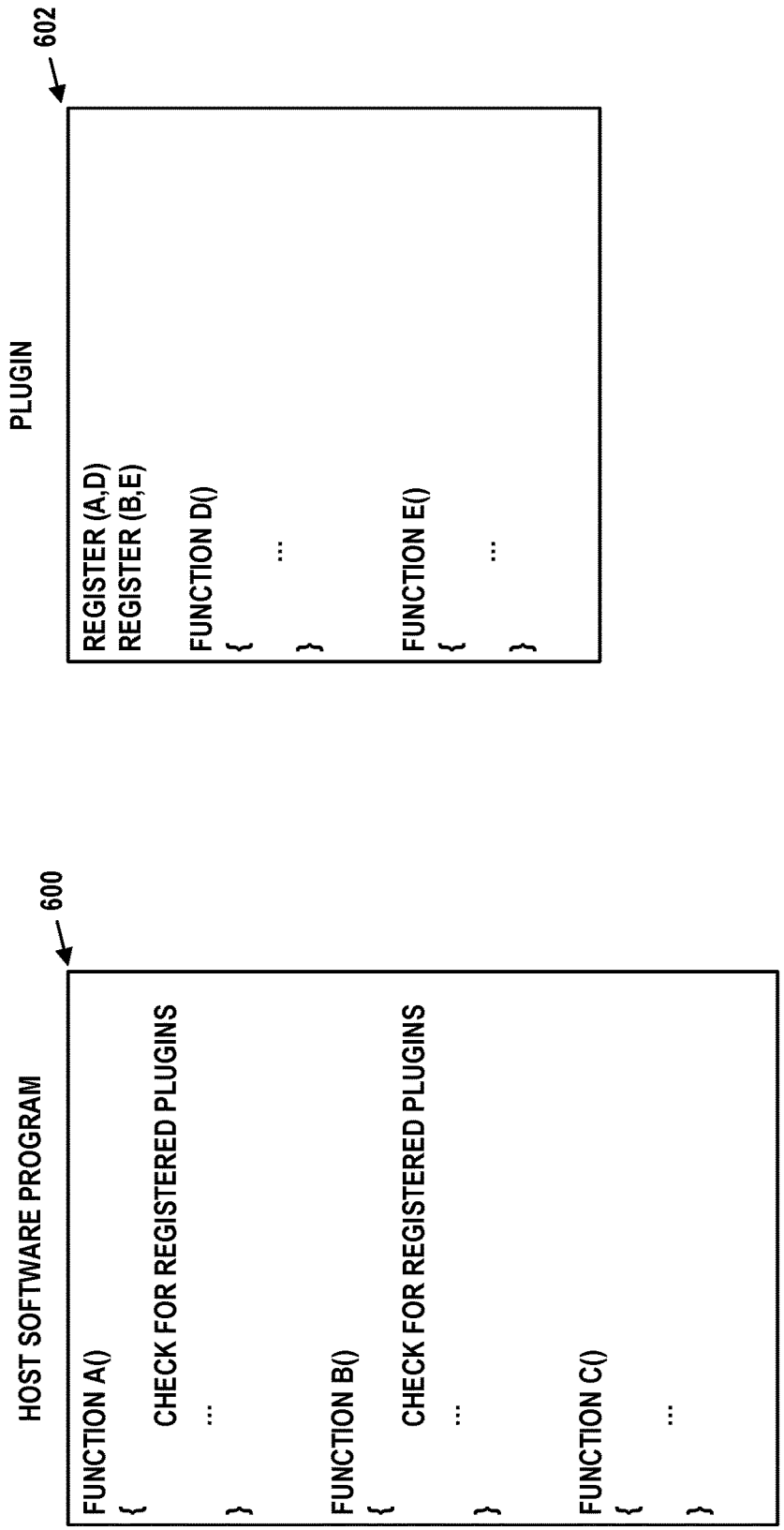
FIG. 6A depicts a host software program and a plugin, in accordance with example embodiments.

FIG. 6A depicts an example plugin architecture. Particularly, host software program 600 (e.g., remote network management platform 320 or computational instance 322) contains three functions: A( ), B( ), and C( ). Plugin 602 calls a register( ) function twice, and also defines functions D( ) and E( ). When plugin 602 is installed or initiated, host software program 600 causes the two register functions therein to be called. These register functions associate function A( ) of host software program 600 with function D( ) of plugin 602, and function B( ) of host software program 600 with function E( ) of plugin 602. In other words, when function A( ) is called, function D( ) may be executed at some point during the execution of function A( ). Likewise, when function B( ) is called, function E( ) may be executed at some point during the execution of function B( ).

Functions A( ) and B( ) support plugins, as shown by the pseudocode "check for registered plugins" in each of these functions. Continuing with the example, this means that during its execution, function A( ) may determine that function D( ) has been registered with function A( ), and as a result function A( ) may call function D( ). Similarly, during its execution, function B( ) may determine that function E( ) has been registered with function B( ), and function B( ) may call function E( ). Notably, function C( ) does not contain the pseudocode "check for registered plugins", which implies that function C( ) does not support plugins. Thus, the operation of function C( ) might not be impacted by any enabled plugins.

Herein, an "enabled" plugin may refer to a plugin that is installed and turned on, or otherwise activated. A plugin that is enabled may be accessed and executed by host software program 600. A plugin that is not enabled might not yet have been installed in a manner that makes it accessible to host software program 600, or may have been installed in such a manner but not turned on.

Figure 6B:
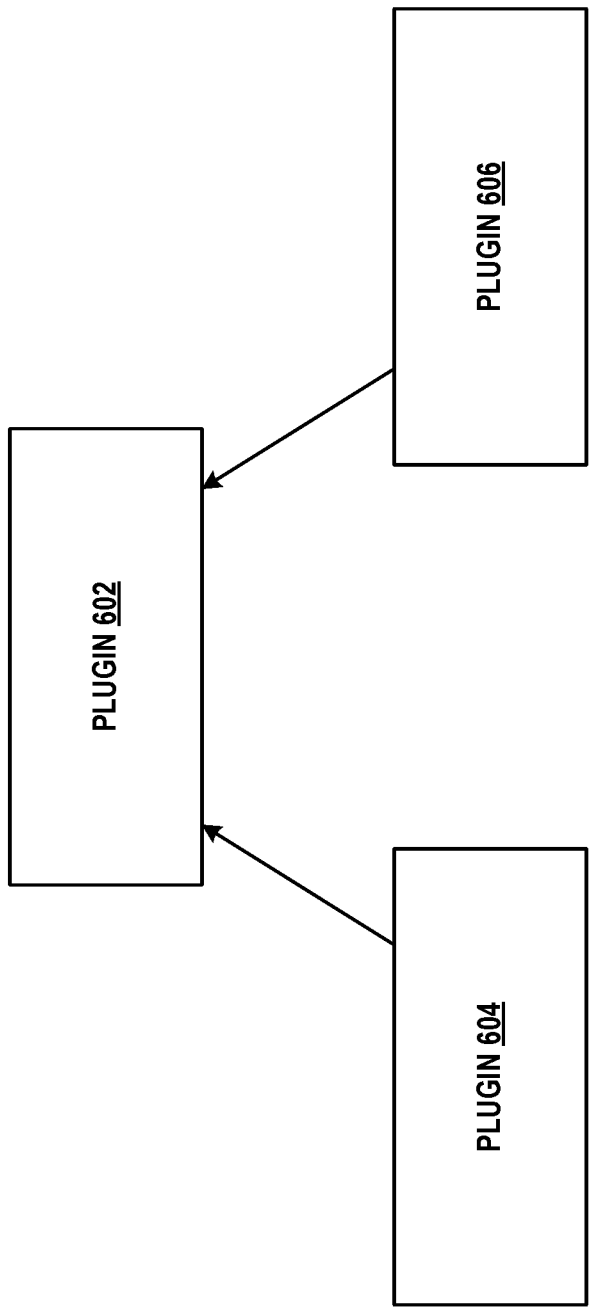
FIG. 6B depicts dependencies between plugins, in accordance with example embodiments.

In some cases, there may be dependencies between plugins. For instance, as shown in FIG. 6B, plugins 604 and 606 depend on plugin 602. Thus, plugins 604 and 606 might not be able to be enabled unless plugin 602 is first enabled. On the other hand, enabling either of plugins 604 or 606 might cause plugin 602 to be automatically enabled. For example, if a user attempts to enable plugin 606, the system may determine whether plugin 602 is enabled. If this is the case, then plugin 606 is enabled. If this is not the case, plugin 602 may be automatically enabled along with plugin 606, or the enabling of plugin 606 may fail.

VI. SOFTWARE ENGINEERING MODELS

Two goals of software development are rapid integration of new features and modified features into the product, as well as having that product in a shippable state throughout most or all of the development process. Traditional software engineering models often fail both of these criteria due to the complexity of coordinating the inclusion of software from a large number of developers into the product. Thus, a release cycle (the time from when work on a software release begins until that release becomes available to customers) can be months or years, and there may be many code paths through the final, shipped product that remain poorly tested or untested.

Throughout the discussion herein, the term "code" may refer to any type of program code related to software or programming. Such program code may include, but is not limited to, source code, object code, executable code, scripting code, data on which code operates, configuration information, and environment variables.

A. Testing

For purposes of simplicity, this discussion will focus on two types of testing in the software development process: unit testing and integration testing. Unit testing involves checking whether a particular unit of code (e.g., a feature or a module) performs in the specified manner. Unit testing is often performed by software developers on the features that they personally develop. Once a feature passes unit testing it is scheduled for integration testing. Integration testing involves merging one or more units of code (either new code or modified code) into a build, and then testing the build. Since some features may have an impact on other features, individual features can pass their respective unit tests, but fail during integration testing.

In some cases, once all features pass integration testing a further round of testing, sometimes referred to a system testing or validation testing, may take place. The goal of this round of testing is to verify system performance goals (e.g., the product is able to sustain 100 transactions per second under certain conditions) and/or to determine whether the product meets design expectations (e.g., the user interface is intuitive and follows a logical flow). Other types of testing may be included in system testing.

In many cases, parts of unit testing and integration testing are automated. For instance, a suite of several thousand regression tests may be performed by loading a build of the product into a test harness (e.g., a non-production software and/or hardware architecture designed to facilitate testing), and letting the suite execute overnight. A report of the test results may be made available to the testers and/or software developers once this suite has completed.

B. Trunk-Based Development

Trunk-based development is a model of software engineering version control in which versions of the software are viewed as a tree, and releases are made from the main trunk of the tree. Thus, the trunk is the base of the software, and side branches off of the trunk are used for parallel development of features. Each side branch may be used for the development of one or more features. Therefore, the trunk almost always represents the latest stable release of the software, while side branches are used for development and unit testing.

When all of the features on a side branch pass unit testing, the side branch may be merged into an integration branch. The integration branch is based on a stable release from the trunk, and is used to resolve conflicts between various side branches. After merge and conflict resolution, the integration branch may be subject to integration testing. Further development may take place on the integration branch or on side branches that are eventually merged back into the integration branch. After a sufficient extent of defects is resolved and integration testing passes, the integration branch is merged into the trunk to become the next release.

VII. SOFTWARE DEVELOPMENT ON A REMOTE NETWORK MANAGEMENT PLATFORM USING PLUGINS

As a way to reduce the complexity of software development on a remote network management platform, plugins may be used during the development process to facilitate the development of discrete features. A remote network management platform generally involves large code bases supporting many interdependent features, as well as isolated features. In such an environment, multiple software developers may be simultaneously developing new features or modifying existing features on the remote network management platform.

Remote network management platform 320 may support plugins. For instance, one way of deploying optional features on remote network management platform 320 is through plugins. Managed network 300 may purchase one or more of these plugins, which are then enabled on computational instances of managed network 300 (e.g., computational instance 322). In this way, managed network 300 may employ the feature(s) of the plugin, while the operator of remote network management platform 320 may obtain additional revenue for providing and supporting such plugins.

The enabling process may involve a user associated with managed network 300 navigating to a web page provided by computational instance 322. This web page may contain a list of plugins that are available to managed network 300. For example, plugins that managed network 300 is authorized to use may appear in a separate list from plugins that managed network 300 is not authorized to use. The user may enable one or more plugins by way of this web page. In some cases, only authorized users (e.g., users with administrative privileges to computational instance 322) can enable (or disable) plugins. Disabling of a plugin may place the plugin in a state in which it cannot be executed by way of host software program 600.

This plugin architecture can be reused during the development process. For instance, at least some new features being added to remote network management platform 320 each may be developed as plugins. During integration testing, the code base including the plugins can undergo initial regression testing by disabling all of the plugins. Then one or more of the plugins can be enabled at a time for testing of those specific plugins and/or further regression testing. Other testing possibilities exist.

Figure 7A:
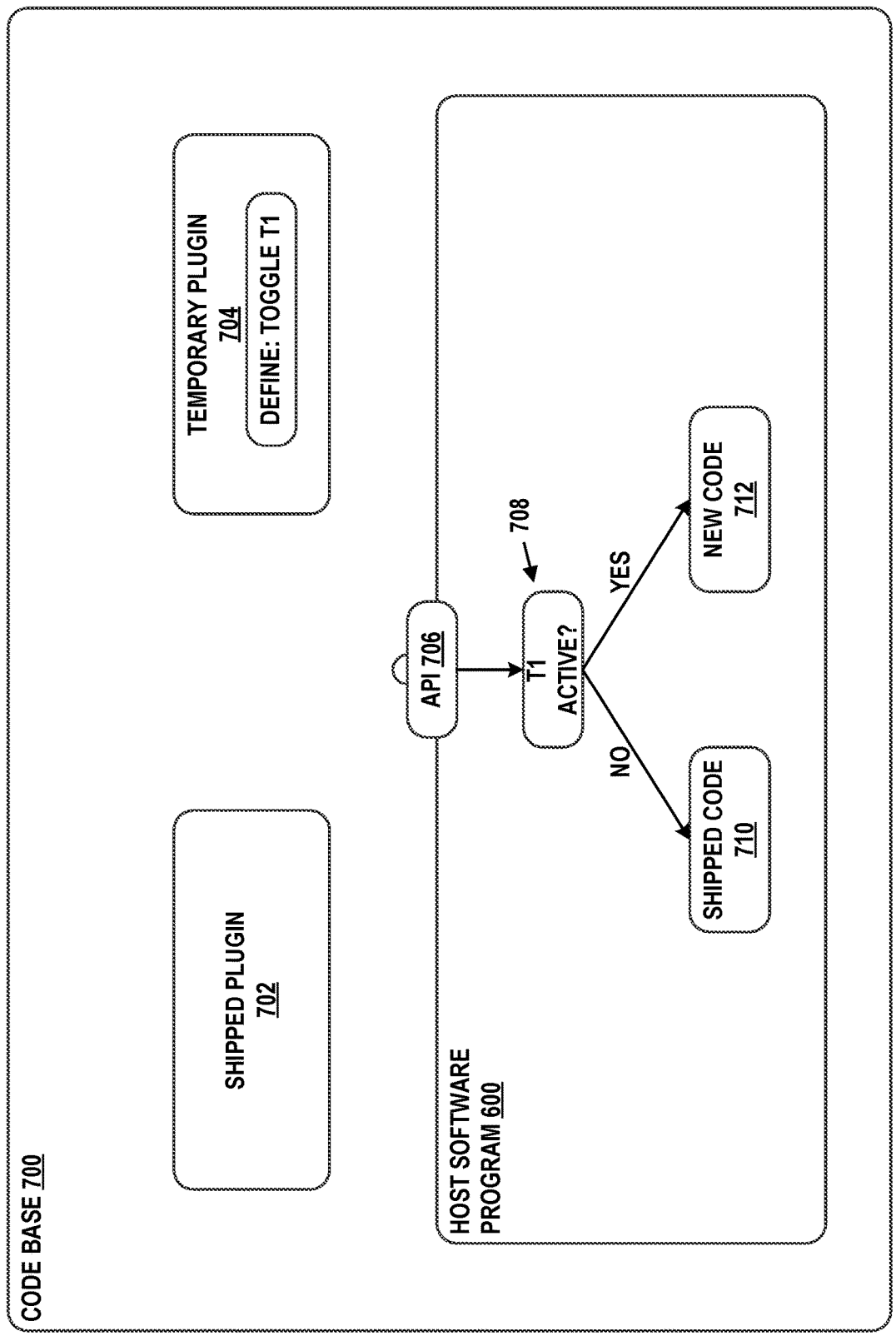
FIG. 7A depicts a software architecture to support feature development in plugins, in accordance with example embodiments.

FIG. 7A illustrates an implementation of a possible development and/or testing architecture and procedure for a plugin. Code base 700 includes host software program 600 (e.g., a computational instance of a remote network management platform), shipped plugin 702 and temporary plugin 704. Host software program 600 may be written, for example, in a compiled or interpreted language (e.g., C++, Java, etc.). Shipped plugin 702 and temporary plugin 704 may be written, for example, in a scripting language, such as JavaScript. Thus, in some embodiments, shipped plugin 702 and temporary plugin 704 may include user interface pages, client-side scripts, and/or server-side scripts.

Host software program 600 may include API 706, which may be one of multiple APIs that allow plugins to initiate classes, call functions, and/or access data by way of host software program 600. Each function supported by API 706 may be defined in terms of the parameters it takes as input (if any), the processing it performs, and the output it provides (if any). As an example, API 706 may define a class with multiple functions (which may also be referred to as "methods") that allows plugins to access and manipulate certain tables of a database. Many other examples are possible.

Plugin 702 includes code that was shipped (e.g., made generally available) in a previous release of code base 700. Thus, plugin 702 may be associated with shipped code 710 and call API 706 to execute shipped code 710. Plugin 704 is a temporary (or new) plugin that includes code that has not yet shipped. Plugin 704 may be associated with new code 712, and also calls API 706 to execute new code 712. Plugin 704 and new code 712 represent code that is still under development and testing. As such, this unshipped code may be an updated version of plugin 702 and shipped code 710, or a new feature.

In order to facilitate rapid development, integration and testing of host software program 600, plugin 704 may define a toggle T1. This toggle may be implemented as a system property, flag, or variable that is scoped such that it can be accessed by host software program 600. Thus, in some embodiments, toggle T1 may be a Boolean variable (taking on values of true or false), an enumerated type (e.g., defined to support values of "active" and "not active") or an integer (where a value of zero indicates that the toggle is not active and any other value indicates that the toggle is active). Regardless of implementation details, when plugin 704 is enabled, toggle T1 may be activated. When plugin 704 is disabled, toggle T1 may be deactivated. The code that supports API 706 may check, at block 708, whether toggle T1 is activated.

Figure 7B:
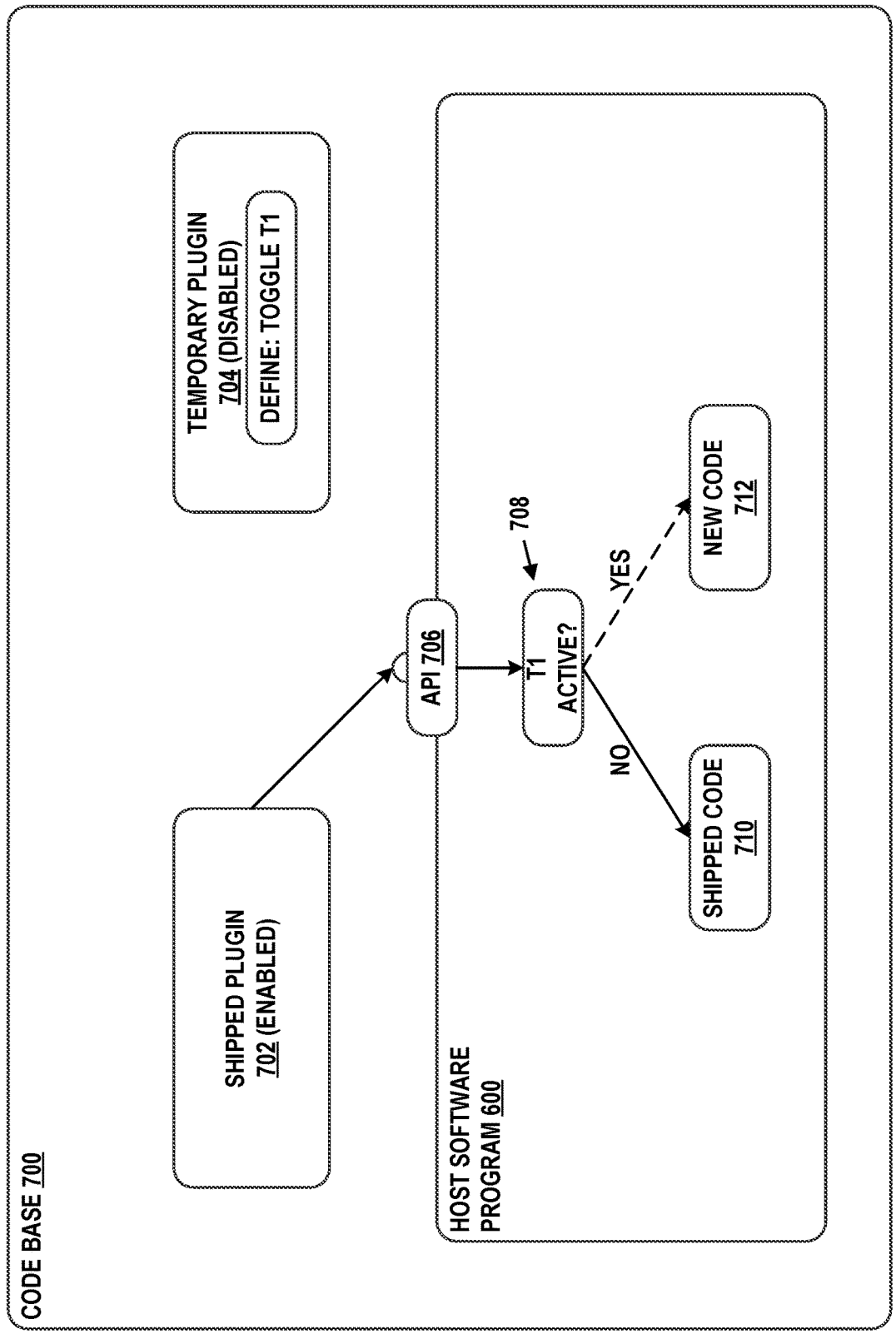
FIG. 7B depicts a software architecture to support feature development in plugins, in accordance with example embodiments.
Figure 7C:
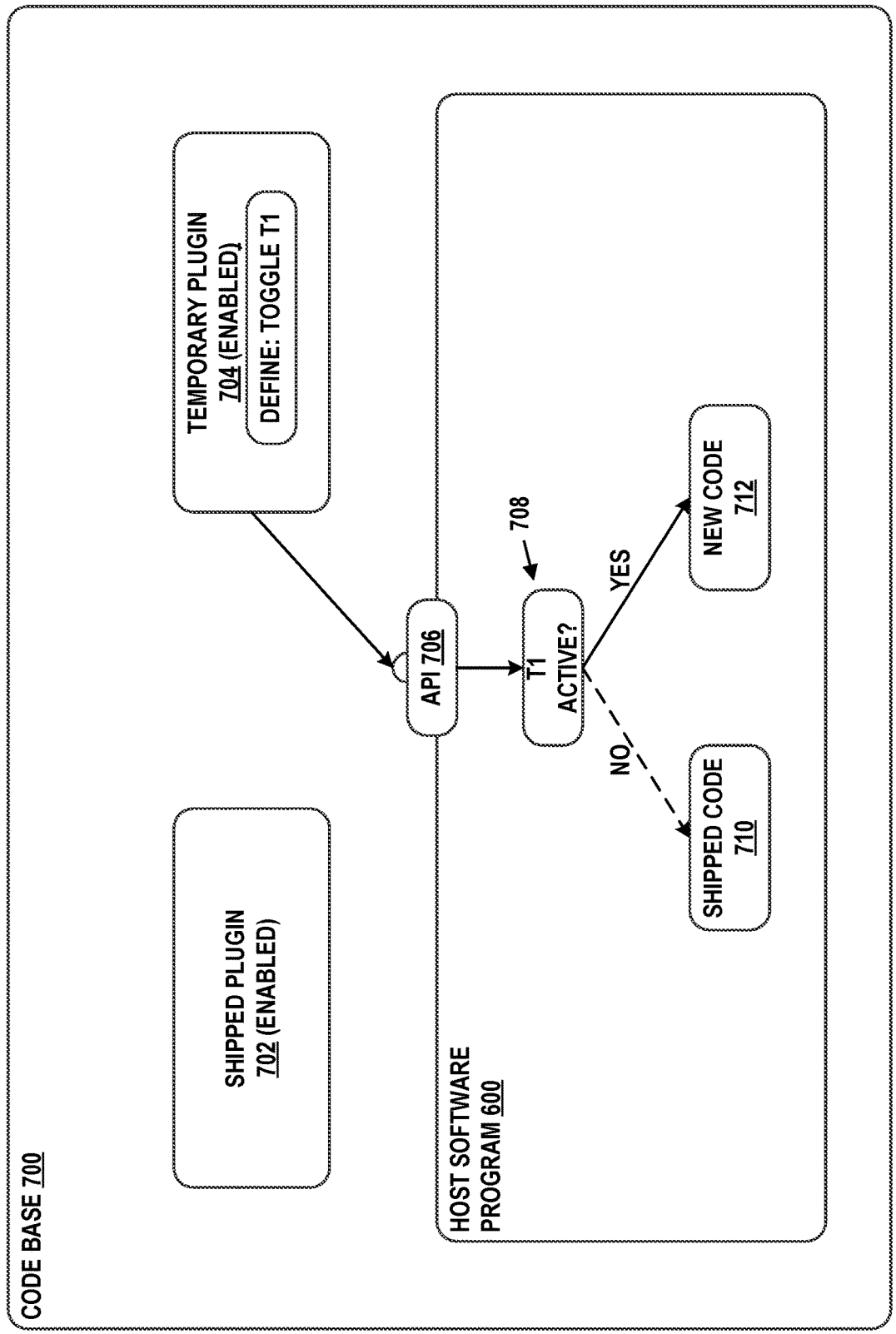
FIG. 7C depicts a software architecture to support feature development in plugins, in accordance with example embodiments.

FIG. 7B illustrates the same architecture as that of FIG. 7A, but in a scenario where plugin 702 is enabled and plugin 704 is disabled. Thus, when plugin 702 calls API 706, block 708 determines that toggle T1 is not active (for instance, toggle T1 might not be defined). In response, shipped code 710 is executed. FIG. 7C illustrates the same architecture as that of FIGS. 7A and 7B, but in a scenario where plugin 702 is enabled and plugin 704 is enabled. Thus, when plugin 704 calls API 706, block 708 determines that toggle T1 is active (for instance, toggle T1 might be defined and take on a particular value). In response, new code 712 is executed. Advantageously, API 706 need not be modified to support toggle T1 as a parameter, thereby preserving backward compatibility.

When used during software development and testing, this plugin architecture simplifies procedures. A developer who is assigned a new feature may be able develop at least part of that feature as a plugin (e.g., parts of the feature not within host software program 600 might be placed in a plugin). Alternatively, for a more complicated feature, the developer can divide the functionality of the feature into two or more plugins, possibly with dependencies therebetween. Each plugin may have its own unique toggle.

The developer can then develop these features in a substantially serial fashion. When the developer finishes a plugin, he or she can unit test the plugin by activating its toggle and then running tests. This way, the developer can determine whether the plugin is performing the required new operations. Additionally, the developer can regression test other parts of the code base with the toggle both activated and deactivated. In this fashion, the developer can determine whether any changes made to the code base by the feature caused a defect in existing code. A similar testing process can be carried out by dedicated testers, for example, during integration testing.

As an example, suppose that a developer is assigned a feature that involves design of two new web pages (e.g., as a combination of HTML and scripts) for a remote network management platform. Each of the web pages requires that a certain type of data be sorted according to specific criteria. The developer may divide the functionality of the feature into three plugins: one for the sorting algorithm, one for the first web page, and one for the second web page. The dependency structure of these plugins may be represented by FIG. 6B, where plugin 602 contains the sorting algorithm, while plugins 604 and 606 contain the respective web pages.

The developer may develop the plugin with the sorting algorithm first. Once this plugin has passed unit and integration tests, it can be committed to the code base, and the code base remains shippable. Even though the plugin is not used and is disabled by default, testing has verified that its presence in the code base does not have a negative impact on shipped features. Then (or somewhat in parallel to the development and test of the plugin with the sorting algorithm), the developer may develop the plugins for the two web pages. As each of these is completed, the developer tests them (the plugin with the sorting algorithm is enabled for this testing) and commits each to the code base when the testing passes.

Following this procedure is an improvement over traditional trunk-and-branch-based development. As discussed above, in the traditional model, a main line of the code base, the trunk, is maintained largely in a shippable format. Development and integration takes place on side branches, and each branch may include multiple features. Thus, all features in a branch must be complete before the side branch can be tested, and any defect in one or more the features will prevent the side branch from being merged into the trunk. As a consequence, feature development and testing takes longer if the goal is to maintain the trunk in a shippable state. While one could limit each side branch to an individual feature, such a feature still needs to be completely developed and tested before it can be merged into the trunk. Without plugins, one cannot divide the feature into a number of discrete, individually units that can be enabled or disabled during testing.

Figure 8A:
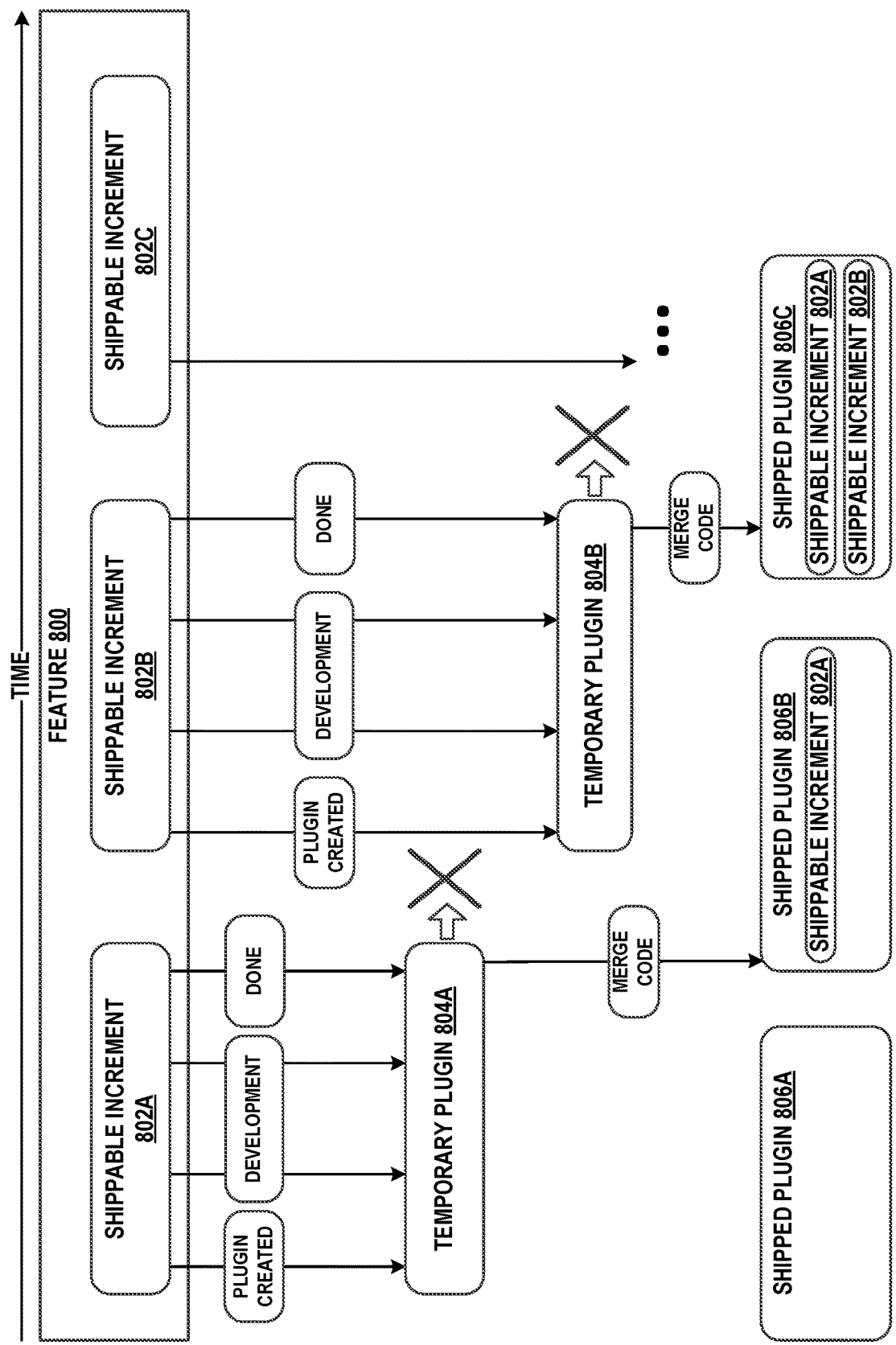
FIG. 8A depicts a software development process involving plugins, in accordance with example embodiments.

Details regarding possible development and testing procedures are illustrated in FIGS. 8A-8D. FIG. 8A depicts a feature 800 that is divided into three shippable increments 802A, 802B, and 802C. These increments may be modules of code, such as individual classes or functions, for example. FIG. 8A shows the development and testing of shippable increments 802A, 802B, and 802C over time, with time flowing from left to right. It is assumed that the code base (e.g., the main trunk or a stable snapshot thereof) already contains shipped plugin 806A, which has passed the requisite testing.

Development of shippable increment 802A includes creating temporary plugin 804A. Any code, data, scripts and configuration information may be added to temporary plugin 804A. Advantageously, the developer can code and unit test shippable increment 802A independently of shippable increments 802B and 802C. Furthermore, the developer can regression test any changes related to shippable increment 802A by disabling temporary plugin 804A. Once development and unit testing are complete, shippable increment 802A is merged into the code base. Integration testing may take place, and then shipped plugin 806B with shippable increment 802A can be released. Temporary plugin 802A may be discarded or stored indefinitely in a side branch.

Likewise, development of shippable increment 802B begins by creating temporary plugin 804B. The developer can code and unit test shippable increment 802B independently of shippable increment 802C. However, if shippable increment 802B depends on shippable increment 802A or is intended to coexist with shippable increment 802A, unit testing should include consideration of interactions between these increments. Nonetheless, the developer can regression test any changes related to shippable increment 802B by disabling temporary plugin 804B. Once development and unit testing are complete, shippable increment 802B is merged into the code base. Integration testing may take place, and then shipped plugin 806C with shippable increments 802A and 802B can be released. Temporary plugin 802B may be discarded or stored indefinitely a side branch.

Similar to shippable increments 802A and 802B, shippable increment 802C may also be developed and unit tested as a temporary plugin. This temporary plugin may then be integrated with shippable increments 802A and 802B into a shipped plugin.

This architecture facilitates independent development of features when there are no dependencies between these features. For example, FIG. 8B depicts development and testing of feature 810 (increments of which have been placed in temporary plugins 812A, 812B, and 812C) and feature 814 (increments of which have been placed in temporary plugins 816A, 816B, and 816C). As long as no dependencies between the features exist, parallel development of the plugins can take place.

Figure 8C:
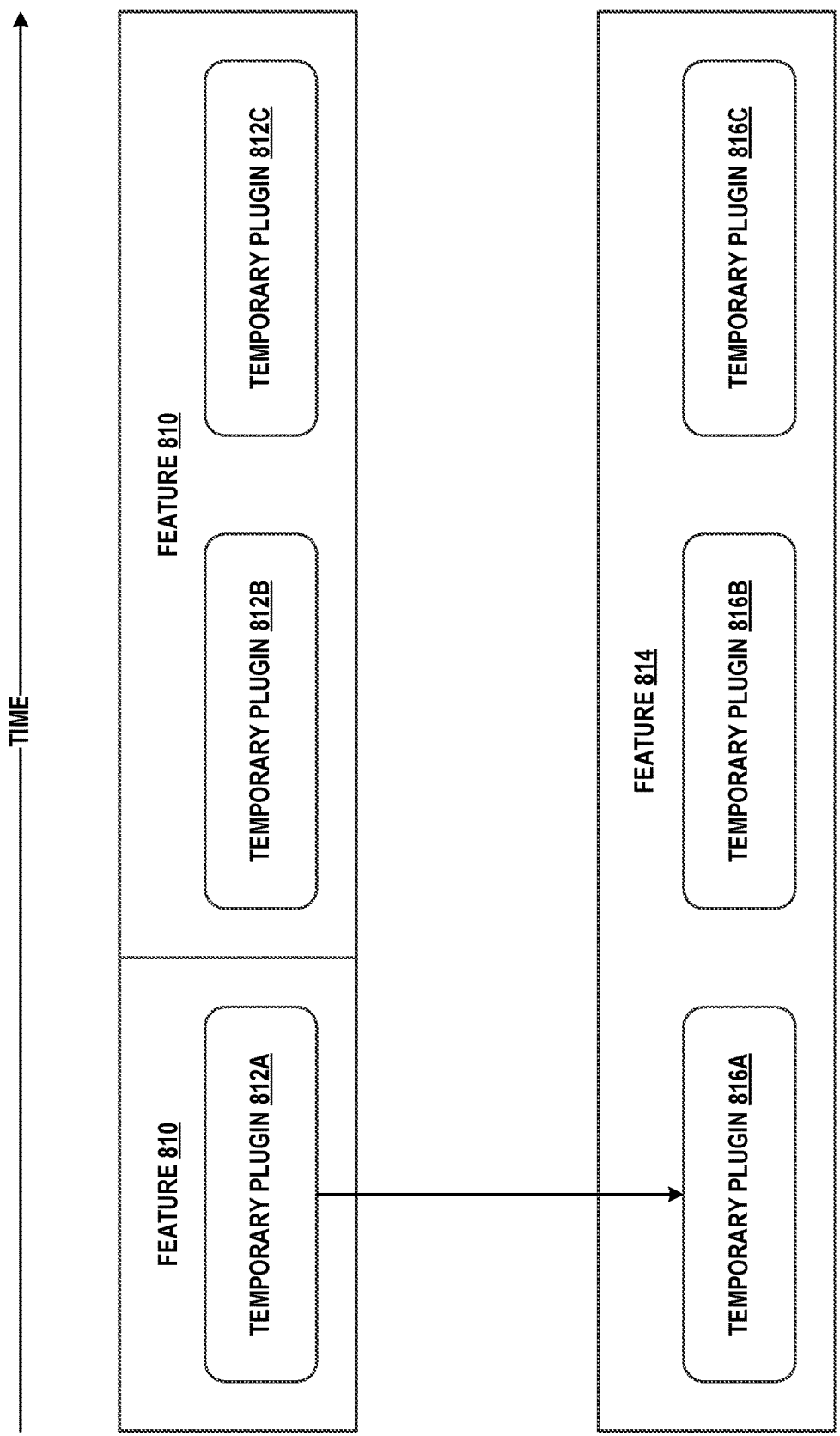
FIG. 8C depicts parallel development of features using plugins with dependencies therebetween, in accordance with example embodiments.

On the other hand, FIG. 8C depicts a situation in which the increment in temporary plugin 812A depends on the increment in temporary plugin 816A. In this scenario, the dependency can be formalized in the code base so that enabling temporary plugin 812A automatically enables temporary plugin 816A. This implies that temporary plugin 816A can be shipped without temporary plugin 812A, but temporary plugin 812A cannot be shipped without temporary plugin 816A. Furthermore, development and/or testing of temporary plugins 812B and 812C may require that both temporary plugins 812A and 816A are released, or at least mature enough for testing.

Figure 8D:
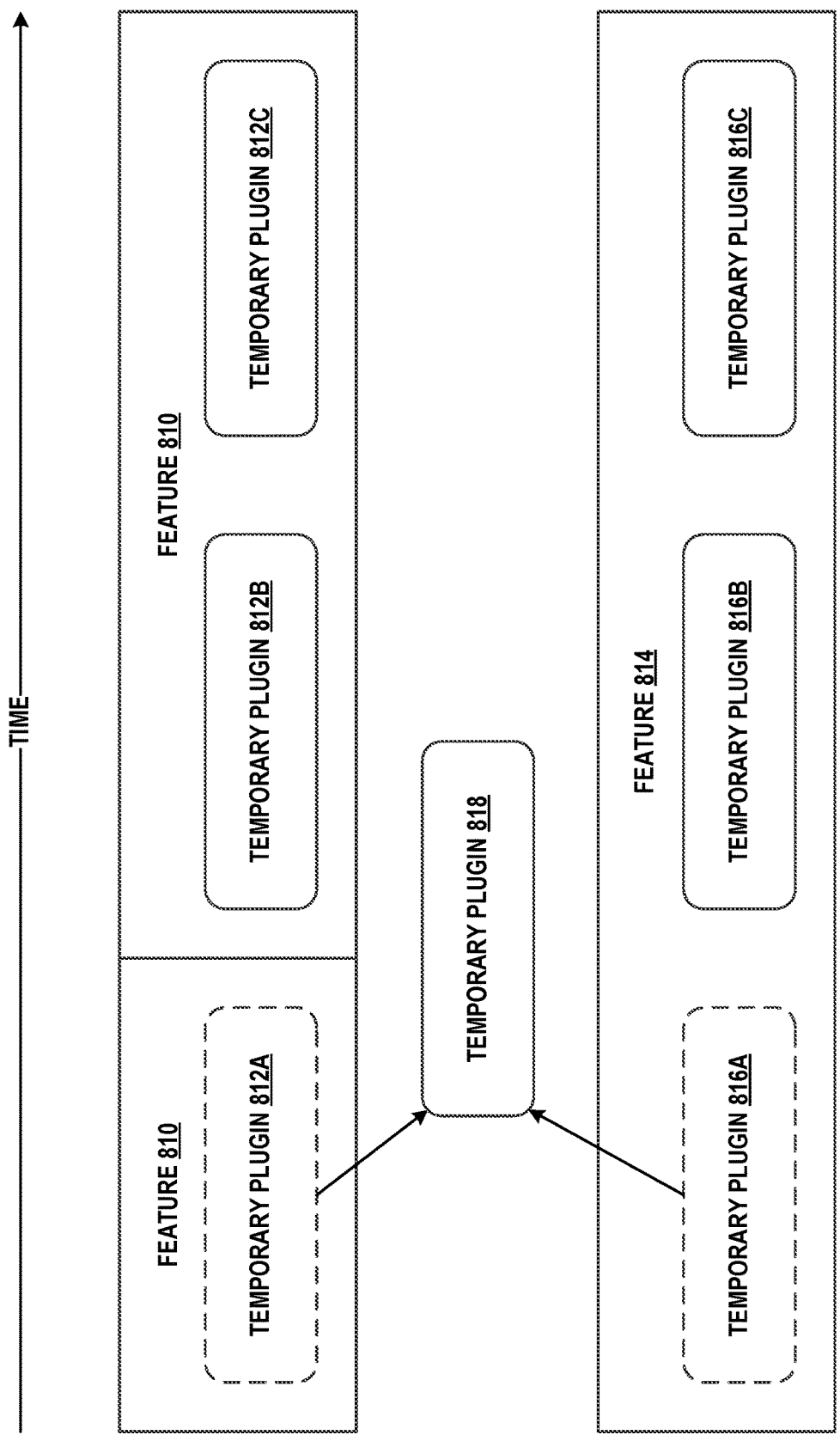
FIG. 8D depicts merging interdependent plugins, in accordance with example embodiments.

In some cases, a two-way dependency may exist in which temporary plugins in different features depend on one another. For example, FIG. 8D illustrates such a mutual dependency between temporary plugins 812A and 816A. In this case, the increments from those two plugins are merged into temporary plugin 818, because temporary plugins 812A and 816A cannot be released independently of one another. Furthermore, development and/or testing of temporary plugins 812B, 812C, 816B, and 816C may require that temporary plugin 818 is released, or at least mature enough for testing.

Following these procedures, it is possible that the same file of code is modified by two different plugins during development. In this event, the first plugin merged into the code base overwrites the existing file. The second plugin to be merged first needs to reconcile any conflicts with the first plugin, then the resulting file can overwrite the file as modified by the first plugin.

Regression and new feature testing can also take advantage of this plugin-based architecture. Consider, for the moment, just a single plugin and any associated code that is added to the host software program. In order to test the host software program with the plugin enabled and disabled, two testing passes may be used. In the first pass, the plugin is disabled, and the usual regression test suite is performed. In the second pass, the plugin is enabled, and two types of tests are performed. The first type includes new tests specifically designed to validate the functionality of the plugin. The second type includes tests from the regression suite that were modified to validate changes to existing functionality made by the plugin. In some situations, either there may be no tests of the first type and only tests of the second type, or no tests of the second type and only tests of the first type.

VIII. EXAMPLE OPERATIONS

Figure 9:
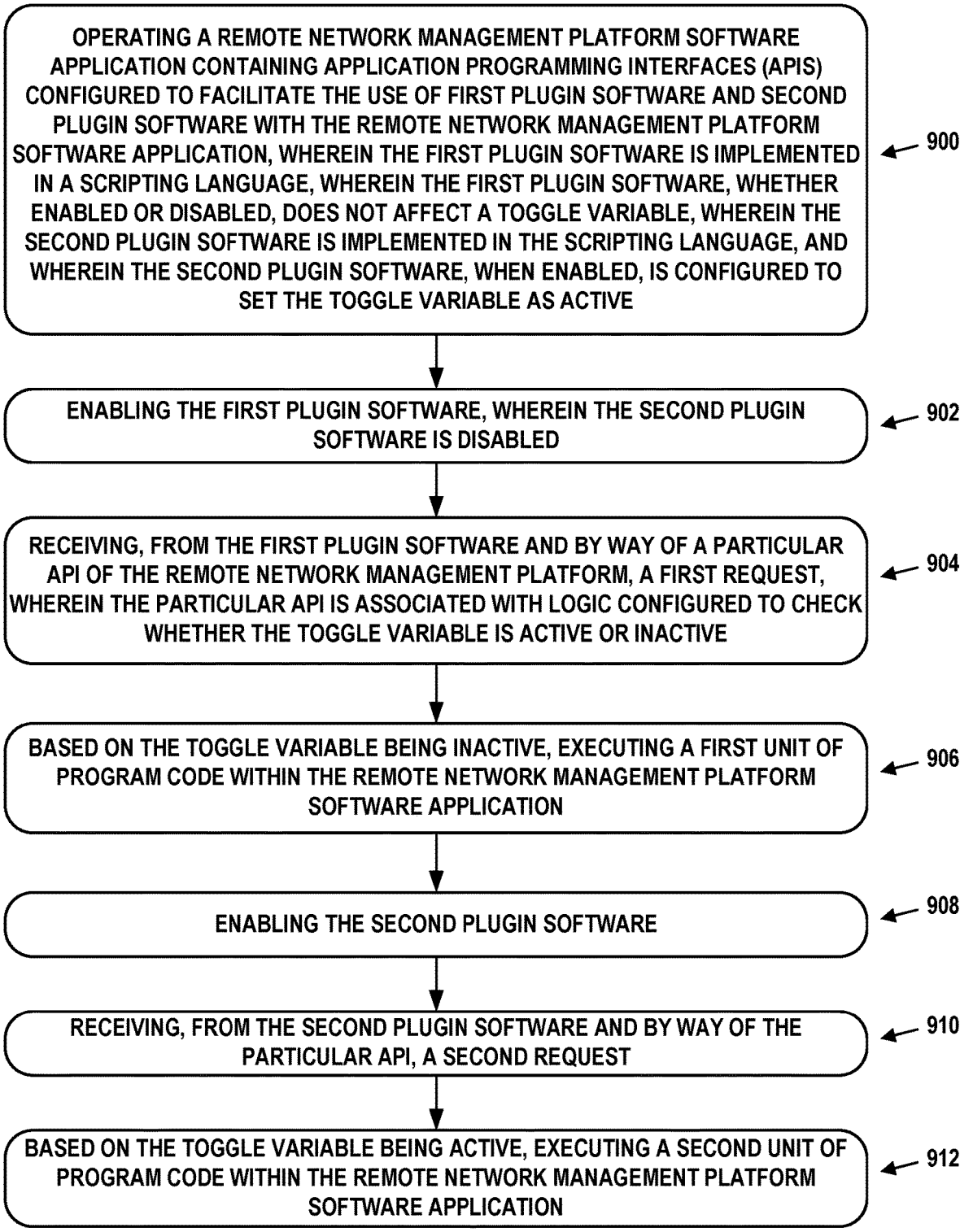
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 of FIG. 9 may involve operating a remote network management platform software application containing APIs configured to facilitate the use of first plugin software and second plugin software with the remote network management platform software application. The first plugin software may be implemented in a scripting language. The first plugin software, whether enabled or disabled, does not affect a toggle variable. The second plugin software may be implemented in the scripting language. The second plugin software, when enabled, is configured to set the toggle variable as active.

Block 902 may involve enabling the first plugin software. At this point, the second plugin software is disabled.

Block 904 may involve receiving, from the first plugin software and by way of a particular API of the remote network management platform, a first request. The particular API may be associated with logic configured to check whether the toggle variable is active or inactive.

Block 906 may involve, possibly based on the toggle variable being inactive, executing a first unit of program code within the remote network management platform software application.

Block 908 may involve enabling the second plugin software.

Block 910 may involve receiving, from the second plugin software and by way of the particular API, a second request.

Block 912 may involve, possibly based on the toggle variable being active, executing a second unit of program code within the remote network management platform software application.

In some embodiments, the first unit of program code and the second unit of program code implement features of the remote network management platform software application.

In some embodiments, the remote network management platform software application is implemented in Java, and wherein the scripting language is JavaScript.

In some embodiments, the toggle variable is defined by the second plugin software.

Some embodiments may further involve: (i) executing a suite of regression tests with the toggle variable inactive, where the suite of regression tests is arranged to test the first unit of program code but not the second unit of program code, and (ii) executing a suite of new tests and modified tests with the toggle variable active, where the suite of new tests and modified tests is arranged to test the second unit of program code, where the new tests are not in the suite of regression tests, and where the modified tests are versions of at least some of the regression tests updated to validate at least some of the second unit of program code.

In some embodiments, the toggle variable being active comprises the toggle variable being defined, and the toggle variable being inactive comprises the toggle variable being undefined. In other embodiments, the toggle variable being active comprises the toggle variable being set to a first value, and the toggle variable being inactive comprises the toggle variable being set to a second value other than the first value.

In some embodiments, the first plugin software has been released as part of the remote network management platform software application, and the second plugin software is configured for development and testing as a temporary plugin to the remote network management platform software application. In some embodiments, the second plugin software is configured to be released as part of the remote network management platform software application after the second plugin software has passed testing as the temporary plugin.

In some embodiments, the first plugin software and the second plugin software are two incremental aspects of a particular software feature, and the first plugin software can be developed and tested independently from the second plugin software.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
one or more server devices configured to run:
   a remote network management platform software application, executable by the one or more server devices;
   a first plugin software implemented in a scripting language, wherein the first plugin software comprises a first unit of program code within the remote network management platform software application;
   a second plugin software implemented in the scripting language, wherein the second plugin software comprises a second unit of program code within the remote network management platform software application; and
   one or more application programming interfaces (APIs) configured to check whether a toggle variable is active or inactive, wherein the second plugin software defines the toggle variable as active or inactive, wherein the remote network management platform software application executes the first unit of program code when the toggle variable is inactive, and wherein remote network management platform software application executes the second unit of program code when the toggle variable is active.

2. The computing system of claim 1, wherein the remote network management platform software application is implemented in Java, and wherein the scripting language is JavaScript.

3. The computing system of claim 1, comprising:
a testing environment with access to (i) a suite of regression tests arranged to validate the first unit of program code but not the second unit of program code, and (ii) a suite of new tests and modified tests arranged to test the second unit of program code, wherein the new tests are not in the suite of regression tests, and wherein the modified tests are versions of at least some of the regression tests updated to validate at least some of the second unit of program code.

4. The computing system of claim 3, wherein the testing environment is configured to:
execute the suite of regression tests with toggle variable inactive; and
execute the suite of new tests and modified tests with the toggle variable active.

5. The computing system of claim 1, wherein the first plugin software and the second plugin software are two incremental aspects of a particular software feature, and wherein the first plugin software can be developed and tested independently from the second plugin software.

6. The computing system of claim 1, wherein the first plugin software does not affect the toggle variable.

7. The computing system of claim 1, wherein the first plugin software is integrated into the remote network management platform software application before the second plugin software.

8. A computer-implemented method comprising:
operating, by one or more server devices, a remote network management platform software application containing one or more application programming interfaces (APIs) configured to facilitate the use of first plugin software and second plugin software with the remote network management platform software application, wherein the one or more APIs are associated with logic configured to check whether a toggle variable is active or inactive, wherein the first plugin software is implemented in a scripting language, wherein the first plugin software comprises a first unit of program code within the remote network management platform software application, wherein the second plugin software is implemented in the scripting language, wherein the second plugin software comprises a second unit of program code within the remote network management platform software application, and wherein the second plugin software defines the toggle variable as active or inactive;
based on the toggle variable being inactive, executing the first unit of program code within the remote network management platform software application;
and
based on the toggle variable being active, executing the second unit of program code within the remote network management platform software application.

9. The computer-implemented method of claim 8, comprising:
executing a suite of regression tests with the toggle variable inactive, wherein the suite of regression tests is arranged to test the first unit of program code but not the second unit of program code; and
executing a suite of new tests and modified tests with the toggle variable active, wherein the suite of new tests and modified tests is arranged to test the second unit of program code, wherein the new tests are not in the suite of regression tests, and wherein the modified tests are versions of at least some of the regression tests updated to validate at least some of the second unit of program code.

10. The computer-implemented method of claim 8, wherein the second plugin software is configured to be incorporated into a subsequent release of the remote network management platform software application following testing as a temporary plugin.

11. The computer-implemented method of claim 8, wherein the first unit of program code within the remote network management platform software application is integrated into a release of the remote network management platform software application and the second unit of program code is integrated into the remote management platform software application following the release of the remote network management platform software application.

12. The computer-implemented method of claim 8, wherein the first plugin software is integrated into the remote network management platform software application before the second plugin software.

13. The computer-implemented method of claim 8, comprising integrating, into the remote management platform software application, the first plugin software before the second plugin software.

14. An article of manufacture including a non-transitory computer-readable medium, having stored thereon program instructions that, upon execution by a computing system, cause the computing system to perform operations comprising:
operating a remote network management platform software application containing one or more application programming interfaces (APIs) configured to facilitate the use of first plugin software and second plugin software with the remote network management platform software application, wherein the one or more APIs are associated with logic configured to check whether a toggle variable is active or inactive, wherein the first plugin software is implemented in a scripting language, wherein the first plugin software comprises a first unit of program code within the remote network management platform software application, wherein the second plugin software is implemented in the scripting language, wherein the second plugin software comprises a second unit of program code within the remote network management platform software application, and wherein the second plugin software defines a toggle variable as active or inactive;

executing the first unit of program code within the remote network management platform software application if the toggle variable is inactive; and executing the second unit of program code within the remote network management platform software application if the toggle variable is active.

15. The article of manufacture of claim 14, the operations comprising integrating, into the remote management platform software application, the first plugin software before the second plugin software.

\* \* \* \* \*